United States Patent
Fagin

[11] Patent Number: 5,194,187
[45] Date of Patent: Mar. 16, 1993

[54] STEAM/WATER MIXER

[75] Inventor: Dietrich Fagin, Duesseldorf, Fed. Rep. of Germany

[73] Assignee: Henkel Kommanditgesellschaft auf Aktien, Duesseldorf-Holthausen, Fed. Rep. of Germany

[21] Appl. No.: 838,704
[22] PCT Filed: Sep. 5, 1990
[86] PCT No.: PCT/EP90/01488
   § 371 Date: Mar. 12, 1992
   § 102(e) Date: Mar. 12, 1992
[87] PCT Pub. No.: WO91/04523
   PCT Pub. Date: Apr. 4, 1991

[30] Foreign Application Priority Data
Sep. 13, 1989 [DE] Fed. Rep. of Germany ....... 3930579

[51] Int. Cl.$^5$ ............................. B01F 3/04; B01F 5/04
[52] U.S. Cl. ........................................ 261/96; 261/97; 261/121.1; 261/DIG. 76
[58] Field of Search ................. 261/96, 97, 94, 121.1, 261/DIG. 76, DIG. 13

[56] References Cited
U.S. PATENT DOCUMENTS 2,094,664 10/1937 Monahan .................. 261/DIG. 13
2,335,250 11/1943 Adlam .................... 261/DIG. 76
2,455,498 12/1948 Kern ..................... 261/DIG. 76
3,322,411 5/1967 Moore ........................ 261/97
3,468,637 9/1969 Hammond .................... 261/94
3,545,731 11/1970 McManus .................. 261/122.1
4,023,932 5/1977 Cohen ....................... 261/94

FOREIGN PATENT DOCUMENTS 483600 10/1929 Fed. Rep. of Germany .
2232764 1/1974 Fed. Rep. of Germany .
2713150 9/1978 Fed. Rep. of Germany .
3245415 6/1984 Fed. Rep. of Germany .
3837728 11/1988 Fed. Rep. of Germany .
410739 5/1910 France .

Primary Examiner—Tim Miles
Attorney, Agent, or Firm—Ernest G. Szoke; Wayne C. Jaeschke; Kenneth Watov

[57] ABSTRACT

The invention concerns a steam/water mixer with steam and water inlets, a vessel for mixing the steam and water, an outlet for passing heated water from the mixing vessel, sintered material located inside the mixing vessel between the steam inlet(s) so that the steam entering the mixing vessel can only pass through the sintered material to the water inlet or the mixing-vessel outlet, wherein packing material is disposed in the space between the sintered material and the interior wall of the mixing vessel.

5 Claims, 5 Drawing Sheets

STEAM/WATER MIXER

BACKGROUND

1.0 Field of the Invention

This invention relates, generally to apparatus for heating water, and more particularly to steam/water mixer.

2.0 Discussion of Related Art

A steam/water mixer of the type in question is known from earlier, hitherto unpublished patent application P 38 37 728.4-52. In this steam/water mixer, the temperature of the outflowing hot water varies by about 10° C. in the event of changes in the counterpressure built up by the spatial height of the hot water hose and the outlet nozzle. Accordingly, the steam/water mixer according to the earlier patent application can only be used for cleaning and similar purposes, but not for heating reactors, stirred tanks, for example in pilot plants, and comparable systems due to the excessive variations in temperature.

3.0 Summary of the Invention

An object of the present invention is to reduce the temperature variations produced in a steam/water mixer of the type mentioned above to such an extent that the improved mixer is suitable for heating the above-mentioned containers and systems.

The steam/water mixer in one embodiment of the invention comprises an inlet for water; an inlet for steam; a vessel for mixing steam and water; an outlet for heated water from the mixing vessel; and a sintered material which is disposed in the mixing vessel between the steam inlet(s) and the water inlet(s), and which is arranged in such a way that the steam entering the mixing vessel only passes to the water inlet or to the outlet of the mixing vessel through the sintered material. The sintered material may be a ceramic or metal. Since the steam flows through the hollow cylinder before mixing and hence bubbles through the water in very fine dispersion, the lime present in the water also precipitates in very fine dispersion and does not form any scale. This finely dispersed lime is discharged from the steam/water mixer with the heated water. Since only fine-bubble steam and water are mixed in the mixing vessel, cavitation noise is also considerably reduced.

According to one embodiment of the invention, the temperature variation problem has been solved by including packings arranged in the space between the sintered material and the inner wall of the mixing vessel. The packings reduce the variations in temperature to around 2° C. despite the varying spatial position of the outlet nozzle and the hot water hose. In addition, the noise level of 68.5 dB (A) generated by the mixer according to the earlier patent application is reduced to 63.5 dB (A) in the mixer according to the present invention for otherwise the same conditions. The mixer according to the invention can still be used for preparing hot water for cleaning and similar purposes. In addition, the mixer according to the invention can be used for heating containers and comparable systems, for example in laboratories, pilot plants and production plants.

The packing elements in one embodiment of the invention are preferably cylindrical in shape. It is particularly advantageous in this regard if the diameter and height of the packing elements are substantially the same. The word "substantially" in this context means that a difference of up to 10% lies within the scope of this embodiment of the invention.

In addition, in one embodiment of the invention the packing elements preferably consist of metal, more particularly stainless steel. Particularly effective noise reduction is obtained in this way.

BRIEF DESCRIPTION OF THE DRAWINGS

One embodiment of the invention is described by way of example in the following with reference to the accompanying drawings, in which like items are identified by the same reference designation wherein.

DETAILED DESCRIPTION OF THE INVENTION

Figure 1:
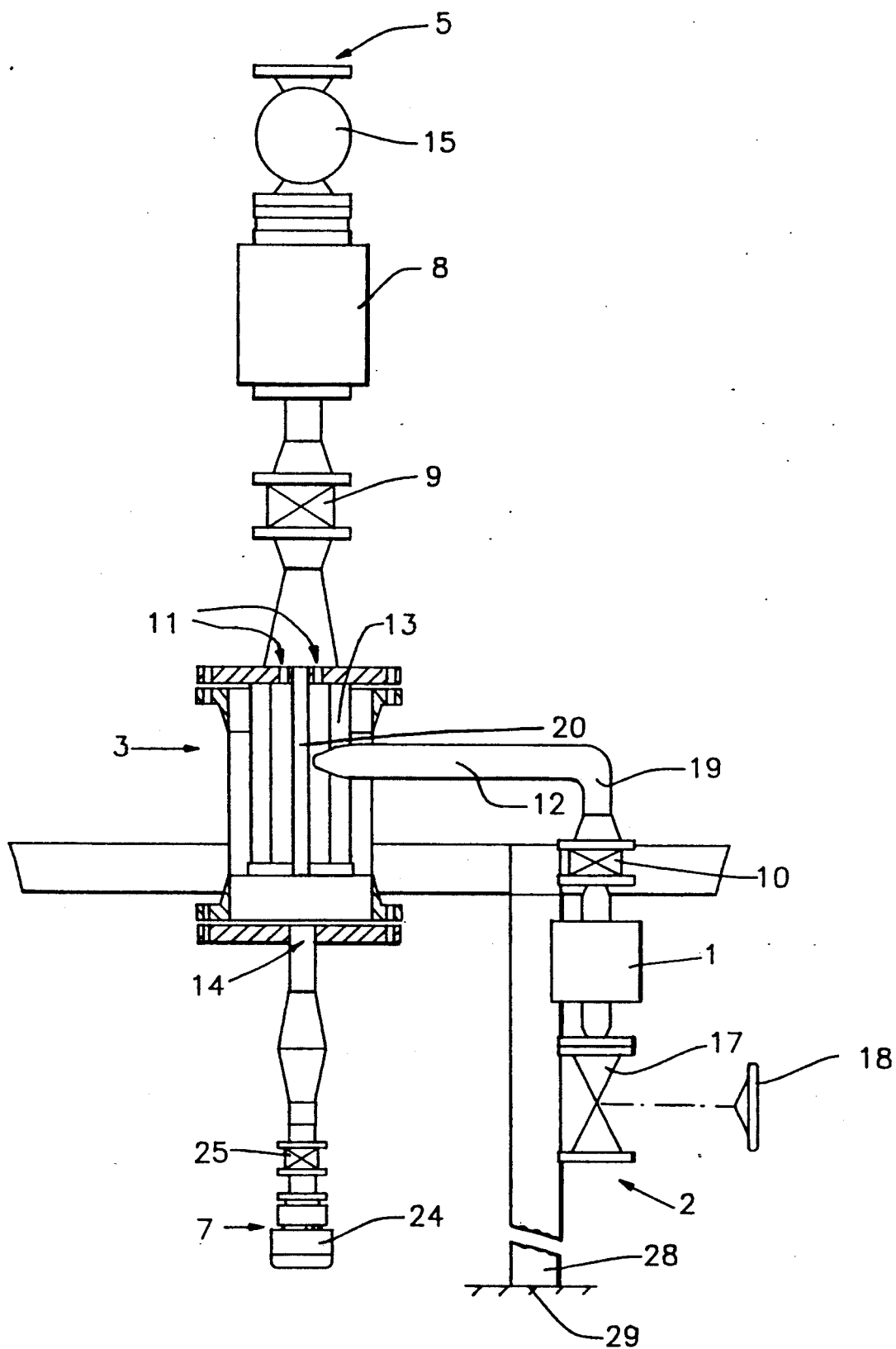
FIG. 1 is a side elevational view of a steam/water mixer according to the invention with a longitudinal section through the mixing vessel.
Figure 2:
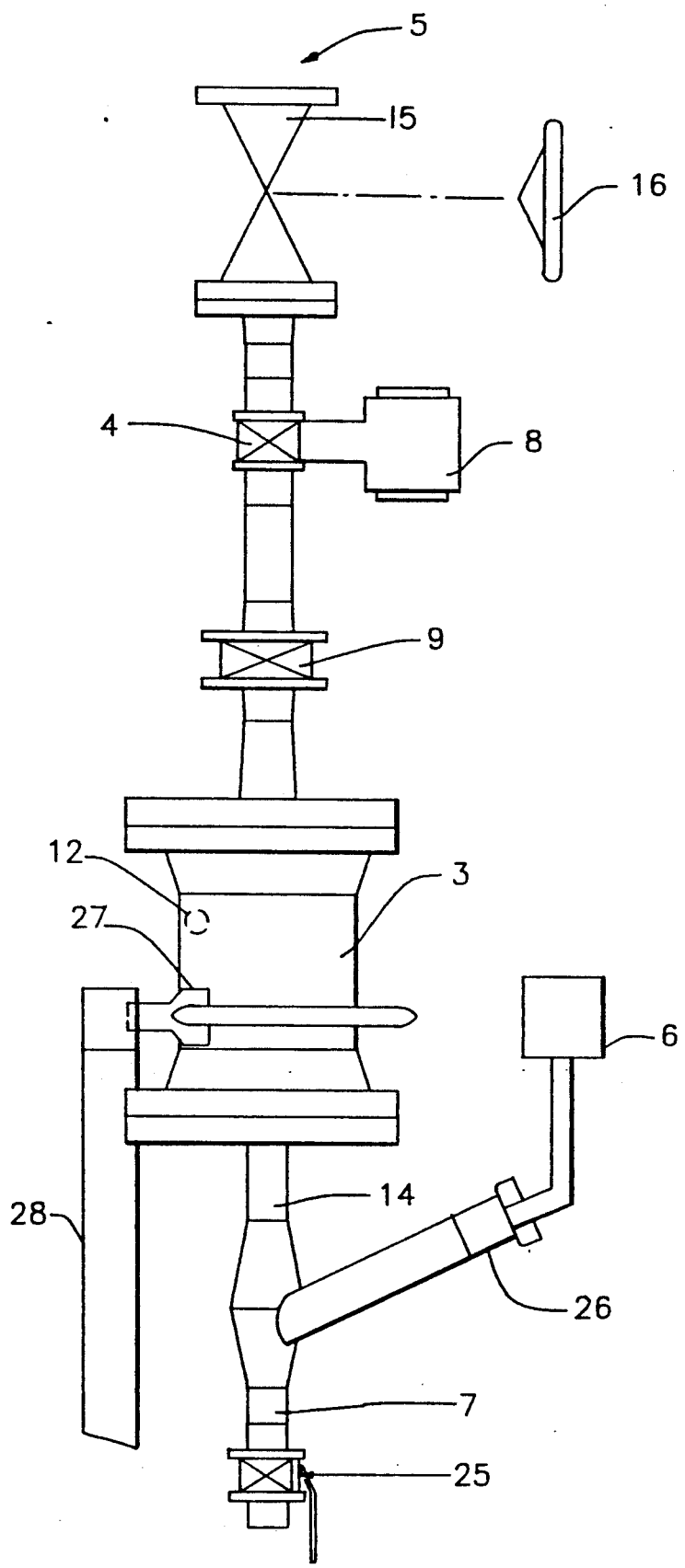
FIG. 2 is a side elevational view of the mixer shown in FIG. 1 looking in a direction at a right angle thereto.

As shown in FIGS. 1 and 2, the steam/water mixer includes a steam inlet 5, an outlet 7 shown at the bottom left-hand side of the drawings, a water inlet 2 shown on the right-hand side adjacent the outlet 7 and a mixing vessel 3 arranged between the inlets and outlets. The steam flows through the steam inlet 5, the throughflow valve 15 operable by the handwheel 16, the steam valve 4, the non-return valve 9, and through the steam inlets 11 into the mixing vessel 3. The steam valve 4 arranged between the throughflow valve 15 and the non-return valve 9 is pneumatically operated by a rotary drive 8 with spring return. The steam valve 4 is a ballcock. As explained hereinafter, the drive 8 is electrically controlled by the throughflow meter 1. The switching time is less than 1 second.

The steam coming from a steam network under a pressure of 4 bar is mixed in the mixing vessel 3 with water from a process water network which flows into the mixer at the water inlet 2. Another throughflow valve 17 operable by a handwheel 18 is provided at the water inlet 2. After passing through the throughflow valve 17, the water flows through the throughflow meter 1 which, only in the presence of a minimum quantity of water, controls the drive 8 in such a way that the steam valve 4 is opened and remains open. After flowing through the throughflow, meter 1, the water flows through another non-return valve 10 and through a 90° bend 19 tangentially into the mixing vessel 3 at the water inlet 12.

Before the water and steam impinge on one another, the steam flows through a hollow cylinder 13 of sintered material inside the mixing vessel 3.

After the steam and water have been thoroughly mixed, the heated water flows through the outlet 14 of the mixing vessel 3 and through a pipe section to the outlet 7 of the steam/water mixer. A coupling 24 is provided at the end of this outlet, for example for the connection of hoses. A ballcock 25 is installed before the coupling 24 for manual shutoff.

The thermal monitoring system of the steam/water mixer is shown in FIG. 2. A control unit 6 connected to a thermocouple (not shown in the drawing) is attached to a laterally branching socket 26. The thermocouple measures the temperature of the water flowing out from the mixing vessel 3. The control unit 6 also acts on the drive 8 of the steam valve 4. The desired maximum temperature of the outflowing water is adjusted through this control unit and the thermocouple.

The steam/water mixer is fixedly connected to a base plate 29 by a pipe clamp 27 and a profile section 28. The illustrated steam/water mixer supplies between 500 and 2,500 liters per hour of hot water (up to 90° C.) and is designed for connection to a steam network under a pressure of 4 bar. A larger mixer is required for larger quantities of hot water. The particularly high reliability in operation is also attributable to the short switching time of the throughflow meter 1 comprising a slot initiator.

Figure 3:
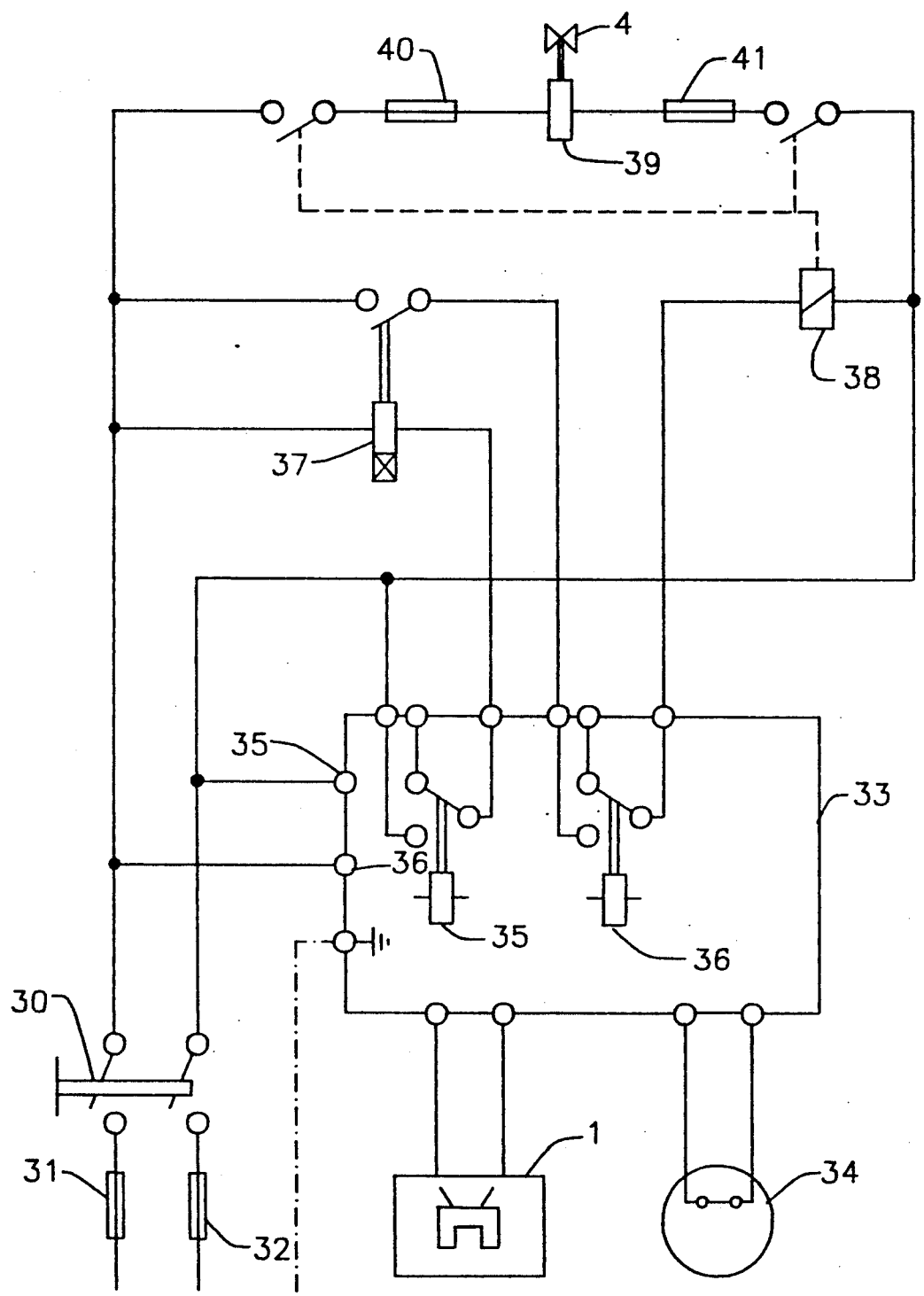
FIG. 3 is a circuit schematic diagram for the control of the mixer shown in FIGS. 1 and 2.
Figure 4:
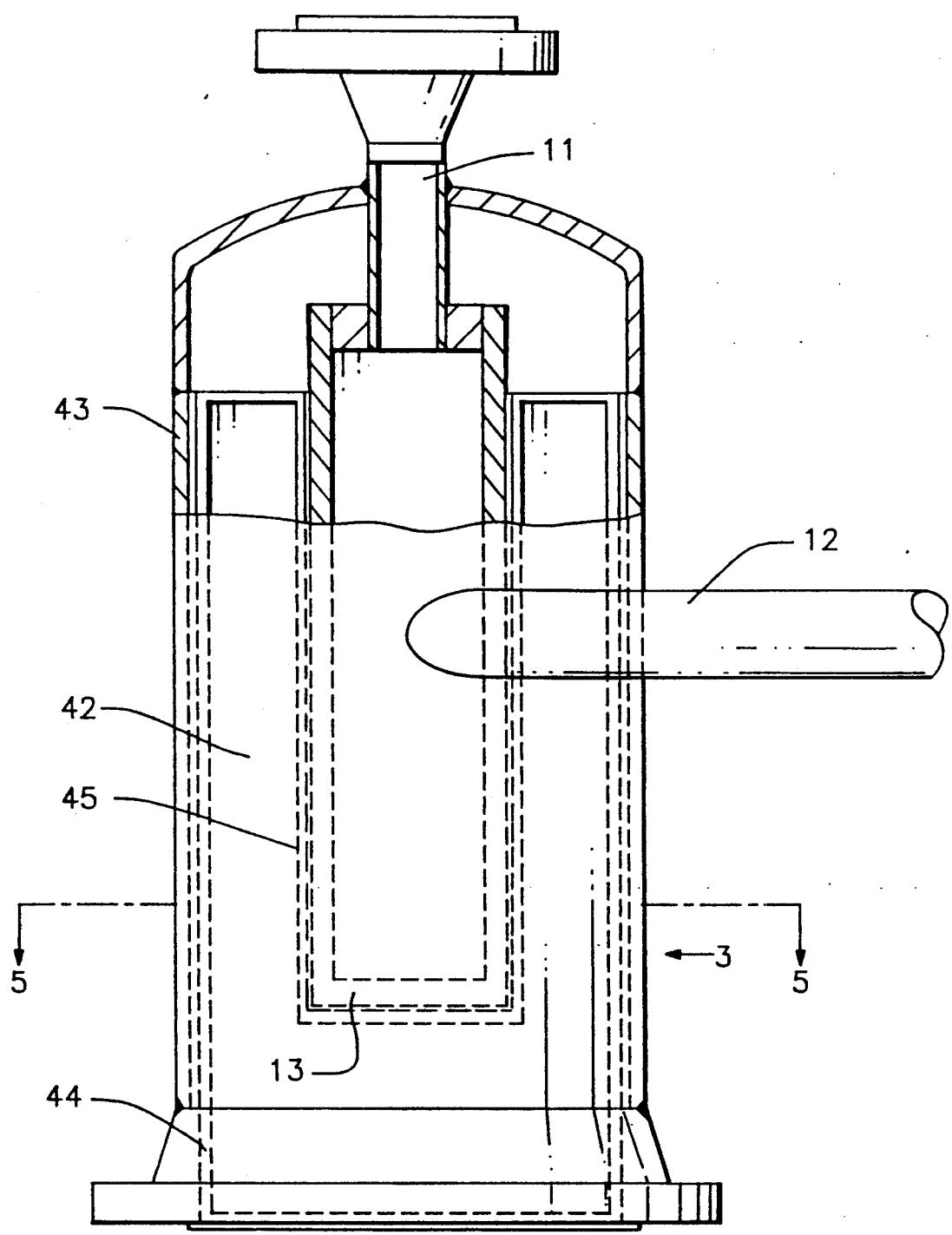
FIG. 4 is a longitudinal sectional view through a mixing vessel according to the invention.

FIG. 3 shows the circuit diagram of the mixer illustrated in FIGS. 1, 2 and 4. The mixer is switched on by the switch 30. There are two fuses 31,32 between the switch 30 and the mains supply. The central component of this circuit is the isolating switch 33. It receives the signals describing the state of the mixer from the throughflow meter 1 and from the thermocouple 34. The isolating switch 33 is supplied with current via the terminals 35 and 36. The throughflow meter 1 and the thermocouple 34 control the relays 35 and 36 in the isolating switch 33. As shown in FIG. 3, the circuit is designed in such a way that the two other relays 37 and 38 only close the circuit when the two relays 35 and 36 pick up at the same time. In this case, current is fed to the magnetic valve 39 which opens the steam valve 4. To increase reliability in operation, the activation circuit of the magnetic valve 39 is connected between and in series circuit with two fuses 40,41 which protect the magnetic valve 39 from excessive current.

Figure 5:
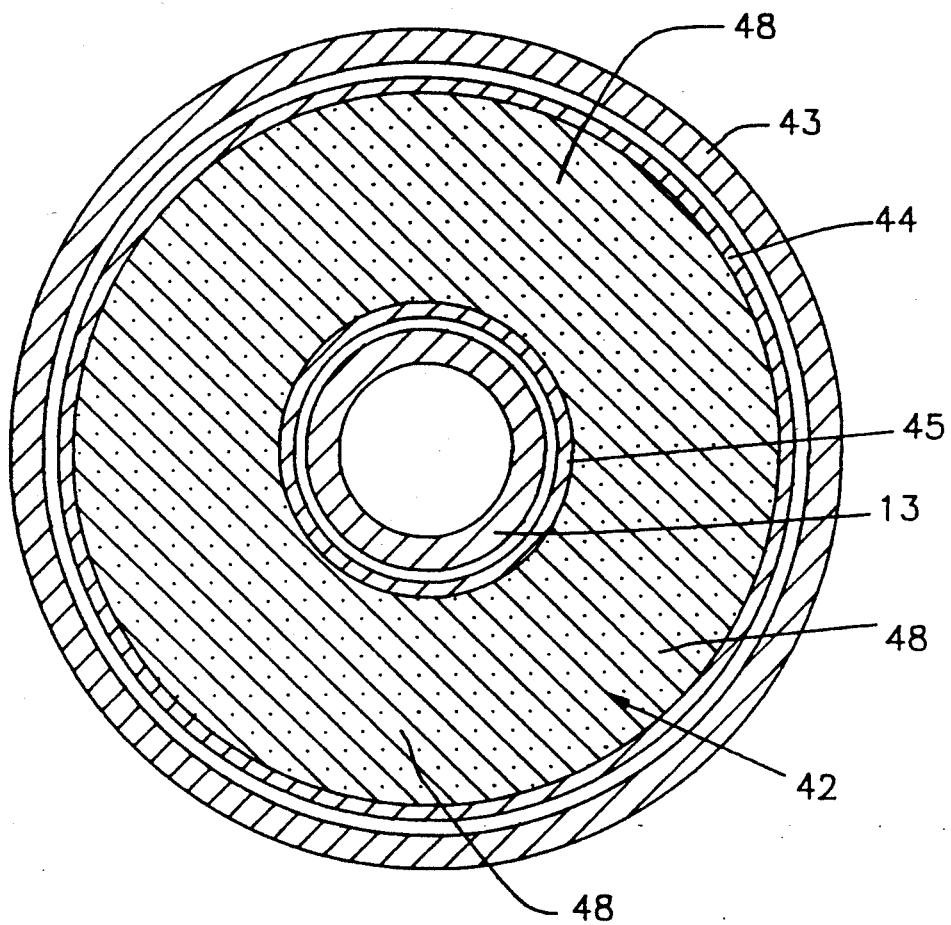
FIG. 5 is a cross-sectional view taken along 5—5 of FIG. 4.

FIG. 4 is a longitudinal section through a mixing vessel 3 corresponding to one embodiment of the invention. Also, with regard to the following description of the one embodiment of the invention, please refer to FIG. 5, which is a cross-sectional view taken along 5—5 of FIG. 4. Another hollow cylinder 44 consisting of a perforated plate with a hollow cylinder 45 disposed concentrically therein is arranged in the mixing vessel 3 between the sintered material 13 in the form of a hollow cylinder with a base and the inner wall 43 of the mixing vessel 3. The inner hollow cylinder 45 also consists of a perforated plate. The cylinder 45 is arranged close to the sintered material 13 while the hollow cylinder 44 is arranged close to the inner wall 43 of the mixing vessel 3. Both hollow cylinders 44 and 45 are connected to one another at their upper surfaces and each have a base. Stainless steel cylinders 48 1 cm in diameter and 1 cm long are arranged as packings inside the space 42 thus formed. These packings, through which the hot water has to pass, reduce the noise level from 68.5 dB (A) to 63.5 dB (A). However, the most important advantage of the packings is that the temperature variations of the outflowing hot water are greatly reduced. If, for example, the temperature of the outflowing hot water varies by about 10° C. without packings, the packings produce a reduction in the temperature variation to around 2° C.

What is claimed is:

1. A steam/water mixer comprising an inlet for steam and an inlet for water; a vessel for mixing steam and water; an outlet for the heated water from the mixing vessel; a porous unit which is disposed in the mixing vessel between the steam inlet and the water inlet, and which is arranged in such a way that the steam entering the mixing vessel only passes to the water inlet or to the outlet of the mixing vessel through the unit, wherein said porous unit includes sintered material; and packings are arranged in a space formed between the porous unit and the inner wall of the mixing vessel.

2. A mixer as claimed in claim 1, wherein said packings are cylindrical in shape.

3. A mixer as claimed in claim 2, wherein the diameter and height of said packings are substantially the same.

4. A mixer as claimed in claim 1, wherein said packings consist of metal.

5. A mixer as claimed in claim 1, wherein said packings consist of stainless steel.

* * * * *